(12) United States Patent
Sun et al.

(10) Patent No.: US 10,949,115 B2
(45) Date of Patent: Mar. 16, 2021

(54) FLASH MEMORY POLLING

(71) Applicant: Western Digital Technologies, Inc., San Jose, CA (US)

(72) Inventors: Chao Sun, San Jose, CA (US); Xinde Hu, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/449,985

(22) Filed: Jun. 24, 2019

(65) Prior Publication Data

US 2020/0401339 A1    Dec. 24, 2020

(51) Int. Cl.
*G06F 3/06* (2006.01)

(52) U.S. Cl.
CPC .......... *G06F 3/0653* (2013.01); *G06F 3/0604* (2013.01); *G06F 3/0659* (2013.01); *G06F 3/0679* (2013.01)

(58) Field of Classification Search
CPC .... G06F 3/0679; G06F 3/0659; G06F 3/0604; G06F 3/0653

USPC ......................................................... 711/103
See application file for complete search history.

(56) References Cited

U.S. PATENT DOCUMENTS

| | | | |
|---|---|---|---|
| 8,438,356 | B2 | 5/2013 | Yoon et al. |
| 8,904,082 | B1 | 12/2014 | Brahmadathan et al. |
| 10,079,048 | B2 | 9/2018 | Syu |
| 10,140,027 | B1 | 11/2018 | Canepa et al. |
| 2009/0172213 | A1 | 7/2009 | Jayachandran et al. |
| 2015/0006794 | A1 | 1/2015 | Kang et al. |
| 2016/0378400 | A1* | 12/2016 | Yang .................... G06F 3/0679 711/156 |

\* cited by examiner

*Primary Examiner* — Hua J Song
(74) *Attorney, Agent, or Firm* — Barry IP Law, P.C.

(57) ABSTRACT

A Data Storage Device (DSD) includes a flash memory for storing data. Portions of the flash memory are grouped into logical groups based on at least one of a number of Program/Erase (P/E) cycles and a physical level location of the portions of the flash memory. A command performance latency is monitored for each logical group, and at least one polling time for each respective logical is set based on the monitored command performance latency for the logical group. The at least one polling time indicates a time to wait before checking whether a portion of the flash memory in the logical group has completed a command.

23 Claims, 7 Drawing Sheets

0 - 100 P/E Cycles: P/E Group 18

101 - 1,000 P/E Cycles: P/E Group 20

$18_0$: P/E Group 0, WL0  $[a_0, a_1, \ldots a_n]$ — $14_0$ $18_1$: P/E Group 0, WL1  $[b_0, b_1, \ldots b_n]$ — $14_1$ $20_0$: P/E Group 1, WL0  $[c_0, c_1, \ldots c_n]$ — $14_2$ $20_1$: P/E Group 1, WL1  $[d_0, d_1, \ldots d_n]$ — $14_3$

FIG. 4

Read Polling Times — $16_0$

| | $T_0$ | $T_{int}$ |
|---|---|---|
| $18_0$ | 42 μs | 2 μs |
| $18_1$ | 43 μs | 2 μs |
| $20_0$ | 48 μs | 3 μs |
| $20_1$ | 50 μs | 4 μs |

Program Polling Times — $16_1$

| | $T_0$ | $T_{int}$ |
|---|---|---|
| $18_0$ | 2030 μs | 60 μs |
| $18_1$ | 2035 μs | 62 μs |
| $20_0$ | 2041 μs | 65 μs |
| $20_1$ | 2050 μs | 62 μs |

Erase Polling Times — $16_2$

| | $T_0$ | $T_{int}$ |
|---|---|---|
| $18_0$ | 1800 μs | 35 μs |
| $18_1$ | 1848 μs | 48 μs |
| $20_0$ | 1920 μs | 65 μs |
| $20_1$ | 1934 μs | 81 μs |

FIG. 5

FLASH MEMORY POLLING

BACKGROUND

Data Storage Devices (DSDs) are often used to record data onto or to reproduce data from a storage media. One type of storage media includes a flash memory, such as a NAND flash. In such DSDs, a controller may need to wait for one command to complete, such as a command to erase a block of NAND memory or to perform a write command, before another command in the same die can be performed, such as a read command. The controller waits before issuing the next command to the die until a status from the die indicates that the die is ready or available to perform the next command. In some cases, the controller may receive the status of the die from a dedicated pin on the die. However, as the size of DSDs has increased with more NAND flash dies, using dedicated pins to determine whether a die is busy has become impractical, because there are not enough pins or connections to the controller for each die.

A more recent method of determining whether a die is busy includes the use of status polling. In this approach, the controller sends a status request on a memory bus to the die to determine if the die is busy. The controller typically waits for an initial time period or an initial polling time following a command to the die before requesting a status. The status request may be repeated at a particular frequency or interval polling time until the die returns a ready status.

If polling times are too short, resources of the DSD are wasted with the preparation, tracking, and bus traffic created by excessive polling requests. On the other hand, if polling times are too long, the efficiency or performance of the flash memory is wasted in terms of the number of commands that can be performed in a given time period (e.g., Input/Output Operations Per Second (IOPS)), since the flash memory dies are generally available to perform the next command before receiving the controller's last status request.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 4 is an example of monitored command performance latency for the logical groups of FIG. 3 according to an embodiment.

FIG. 5 is an example of polling times set for different types of operations for the logical groups of FIG. 3 according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
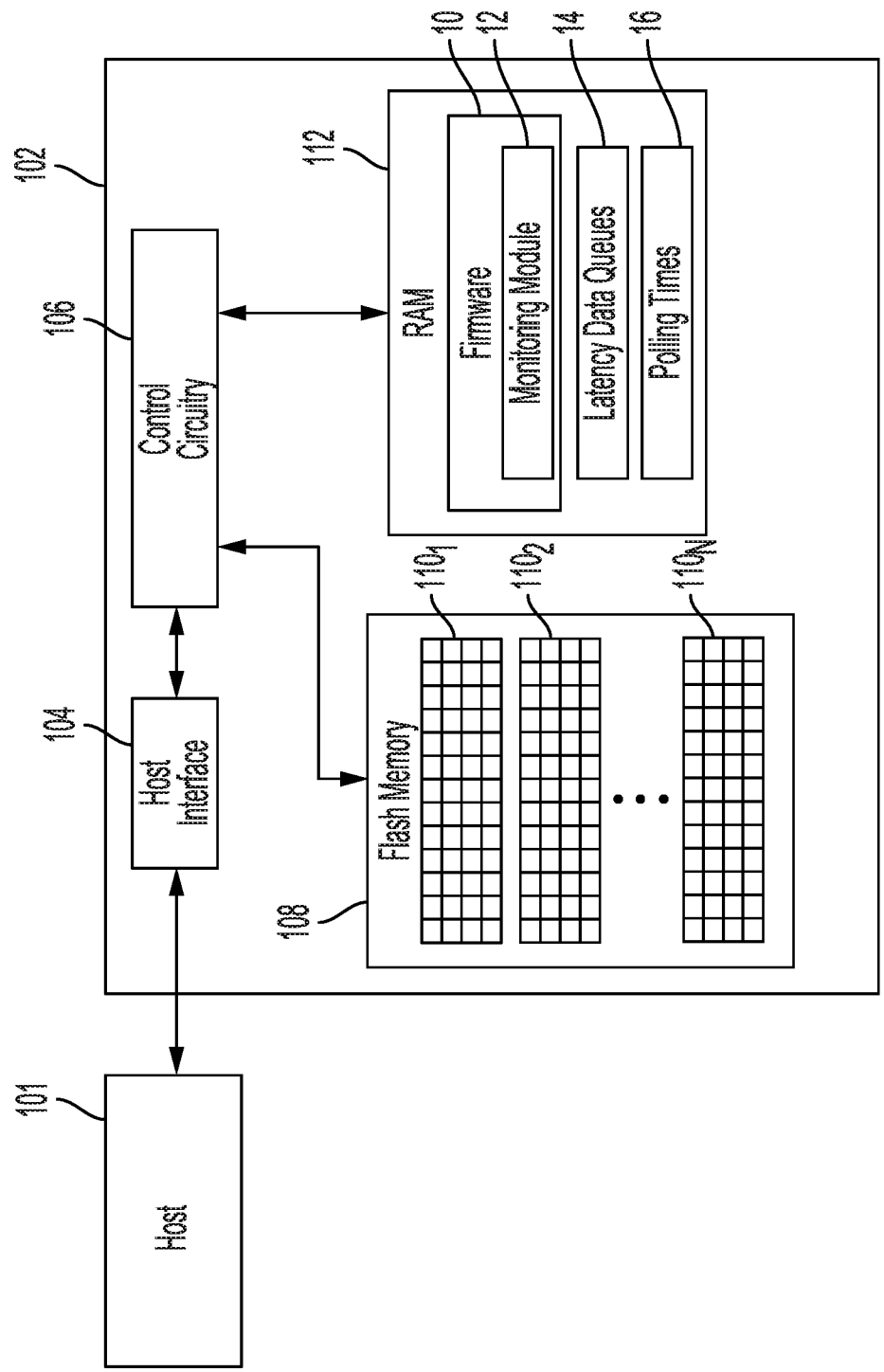
FIG. 1 is a block diagram of a Data Storage Device (DSD) and a host according to an embodiment.

FIG. 1 shows an example of Data Storage Device (DSD) 102 which communicates with host 101 according to an embodiment. Host 101 communicates with DSD 102 to retrieve data from and store data in DSD 102. In some implementations, DSD 102 may include, for example, a Universal Serial Bus (USB) drive or other type of Solid-State Drive (SSD), or may include a memory card, such as a Secure Digital (SD) card. DSD 102 and host 101 may be separate devices or may be housed together as part of a single electronic device, such as, for example, a desktop, laptop or notebook computer or another type of electronic device such as a tablet, smartphone, network media player, portable media player, television, digital camera, or Digital Video Recorder (DVR). As used herein, a host can refer to a device that is capable of issuing commands to a DSD to store data or retrieve data. In this regard, host 101 may include another storage device such as a smart DSD that is capable of executing applications and communicating with other DSDs.

In FIG. 1, host interface 104 of DSD 102 is configured to interface with host 101 using a standard such as, for example, Serial Advanced Technology Attachment (SATA), PCI express (PCIe), Small Computer System Interface (SCSI), Serial Attached SCSI (SAS), USB, Ethernet, Fibre Channel, or WiFi. In this regard, host 101 and DSD 102 may not be physically co-located and may communicate over a network such as a Local Area Network (LAN) or a Wide Area Network (WAN), such as the internet. In addition, host interface 104 may also interface with host 101 using a logical interface specification such as Non-Volatile Memory express (NVMe) or Advanced Host Controller Interface (AHCI) that may be implemented by a driver executing at host 101. As will be appreciated by those of ordinary skill in the art, host interface 104 can be included as part of control circuitry 106 of DSD 102.

Control circuitry 106 can include circuitry such as one or more processors for executing instructions and can include, for example, a microcontroller, a Digital Signal Processor (DSP), an Application Specific Integrated Circuit (ASIC), a Field Programmable Gate Array (FPGA), hard-wired logic, analog circuitry and/or a combination thereof. In some implementations, control circuitry 106 can include a System on a Chip (SoC). Control circuitry 106 can access Random Access Memory (RAM) 112 to execute instructions, such as those from firmware 10 used to control operation of DSD 102.

RAM 112 can include, for example, a volatile RAM such as Dynamic RAM (DRAM), a non-volatile RAM, or other solid-state memory. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

In the example of FIG. 1, RAM 112 can be used by DSD 102 to store data used by control circuitry 106. Data stored in RAM 112 can include data read from flash memory 108, data to be stored in flash memory 108, instructions loaded from firmware 10 for execution by control circuitry 106, and/or data used in executing firmware 10. As discussed in more detail below, such data may include latency data queues 14 that can include command performance latency for different logical groups of flash memory 108 that has been collected or monitored by monitoring module 12 of firmware 10. In addition, RAM 112 can store polling times 16 that are set for different portions of flash memory 108, as discussed in more detail below. As will be appreciated by those of ordinary skill in the art, some or all of firmware 10, latency data queues 14, and polling times 16 may be stored in other memory or memories than RAM 112, such as in flash memory 108 and/or a memory of control circuitry 106.

Flash memory 108 includes dies $110_1$ to $110_N$ that each include blocks that are the smallest unit of memory that can be erased. As understood by those of ordinary skill in the art, pages within the flash memory blocks are the smallest unit of memory that can be written at one time, but the pages can only be erased at the block level. Data can generally only be written or programmed in a page where all the cells in the page have been erased or set to a value of 1. In some implementations, flash memory 108 can include MLC memory (i.e., having two or more levels per cell) to allow for multiple bits to be stored in a given cell. Other implementations can include SLC memory where only one bit is stored per cell.

To change any cells that have been previously written to a value of 0 back to a value of 1 typically requires first erasing all the cells in the entire block back to an erased value of 1. As a result, to change data previously written in a page, the data from the page must usually be rewritten to a new erased page, or an entire block needs to be erased if an erased page is not available. The old page is then indicated as storing invalid or obsolete data and becomes available to be written again after erasure of its block. This cycle of writing (i.e., programming) and erasing a block is known as a Program/Erase (P/E) cycle. Different types of flash memory have varying levels of endurance in terms of the number of P/E cycles the blocks can undergo before the block becomes too damaged or worn from the P/E cycles to reliably store data.

According to one aspect, the present disclosure includes logically grouping portions of a flash memory, such as pages or blocks, into different logical groups based on at least one of a number of P/E cycles and a physical location to set at least one polling time for determining whether a portion of the flash memory in the logical group has completed a command. Although the availability of flash memory typically depends on whether a particular die is currently performing a command, the logical groups of the present disclosure can counterintuitively include portions of flash memory 108 that are in different dies, such as blocks and pages from both dies $110_1$ and $110_2$ in FIG. 1.

A monitored command performance latency for each logical group can be used to more accurately tune or adjust polling times that are not too long or too short. As noted above, a polling time that is too long wastes time waiting for a die of the flash memory to become available. A polling time that is too short, on the other hand, wastes processing resources (e.g., sending and tracking status requests) and communication resources between control circuitry 106 and flash memory 108 (e.g., memory bus traffic) with too many status requests. The present inventors discovered that the command performance latency or time to complete commands can greatly vary among portions of a flash memory that have different amounts of use or P/E cycles, and that polling times can be more accurately adjusted based on the number of P/E cycles.

In addition, in implementations where flash memory 108 is a 3D NAND that stacks memory cells vertically (i.e., a V-NAND), portions of flash memory 108 can be grouped or further grouped by their different physical level locations in the stack. For example, portions of flash memory 108 can be grouped by a Word Line (WL) level indicating whether the portions are above or below a certain level, such as a first WL level for twelve upper levels of cells and a second WL level for twelve lower levels of cells. A monitored command performance latency for each logical group of different physical level locations can be used to accurately tune or adjust polling times. In this regard, the present inventors discovered that the command performance latency or time to complete commands can also greatly vary among portions of a flash memory that are at different physical level locations, and that polling times can be more accurately adjusted based on physical level locations.

In some implementations, the varying command performance latencies for different physical locations, such as WL levels, can be determined offline as part of a factory process for a particular DSD or for a particular generation or type of flash memory by clustering or identifying different physical locations having similar command performance latencies based on statistical evaluation of command performance latencies, such as by using a clustering algorithm or a dynamic threshold based algorithm. The identified variations in command performance latency based on physical location can be set for firmware 10 as physical demarcations for firmware 10 to use when logically grouping portions of flash memory 108. In other cases, firmware 10 may perform its own clustering or identification of physical locations having varying command performance in addition to or in place of default physical location demarcations set for firmware 10 by the DSD manufacturer.

Those of ordinary skill in the art will appreciate that other implementations can include more or less than the elements shown in FIG. 1, and that the disclosed processes can be implemented in other environments. For example, other embodiments can include a different number of hosts, DSDs, or types of non-volatile storage. For example, DSD 102 in other implementations may include additional flash memories, such as where DSD 102 includes an array of flash memories. In another example, DSD 102 may include a rotating magnetic disk in addition to flash memory 108, such that DSD 102 is considered a Solid-State Hybrid Drive (SSHD).

Figure 2:
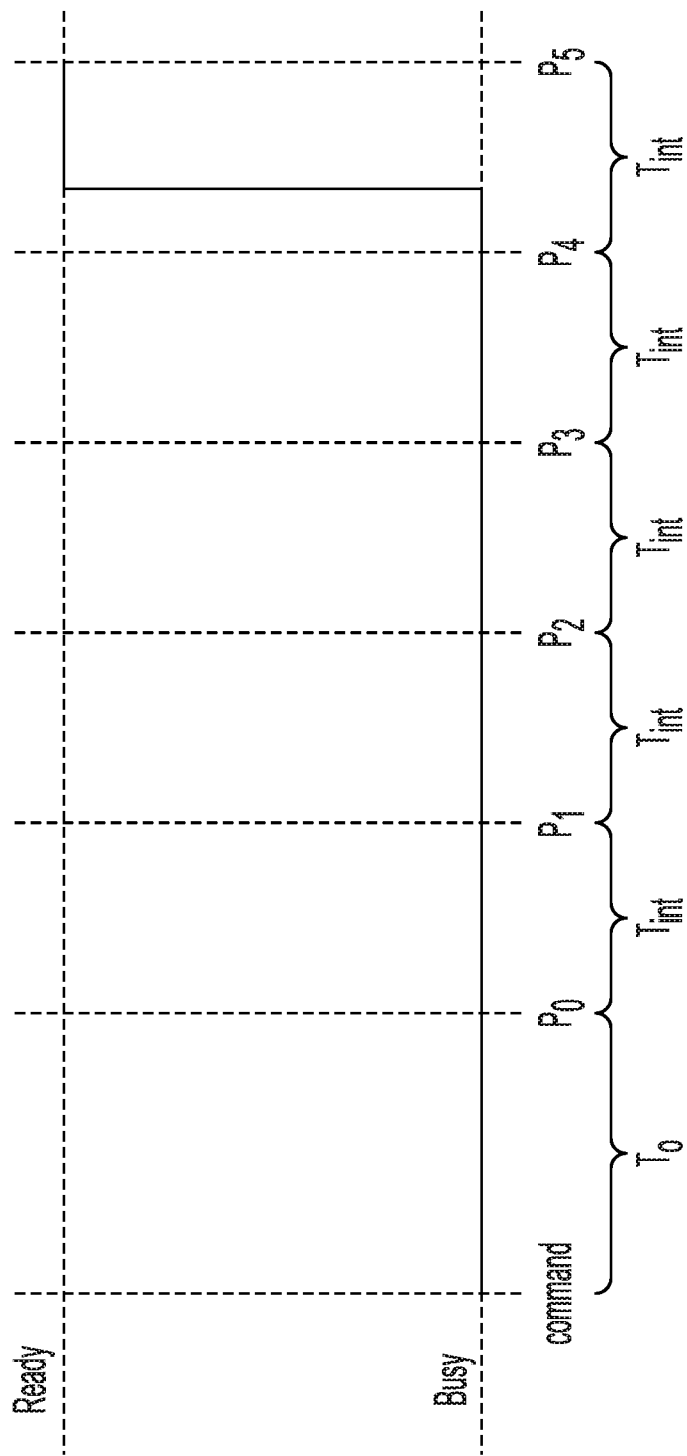
FIG. 2 illustrates an example of polling times and a command performance latency according to an embodiment.

FIG. 2 illustrates an example of polling times and a command performance latency according to an embodiment. As shown in FIG. 2, control circuitry 106 waits an initial polling time of $T_0$ before sending a first status or polling request (i.e., $P_0$ in FIG. 2) to a die 110 to determine if a portion of the die 110 has completed a command and if the die 110 is available to perform another command. If a command completion status is not returned by the die 110 within an interval polling time following $P_0$, control circuitry 106 sends a second status request (i.e., $P_1$ in FIG. 2). As discussed in more detail below with reference to FIG. 5, the initial polling time, $T_0$, and/or the interval polling time, $T_{int}$, can depend on the logical grouping of the portion (e.g., the page or block) of the die 110 where the command is performed in terms of at least one of the number of P/E cycles for the portion and a physical location of the portion (e.g., a physical level location in 3D NAND). The polling times may also depend on the type of command. For example, read commands, write commands, and erase commands may have different polling times for the same page or block.

In the example of FIG. 2, the interval polling time is less than that of the initial polling time. In other examples, there may only be one polling time such that the initial polling time and the interval polling time are the same. The polling times may initially be set based on an expected or specified command performance latency. For example, an initial polling time for all read commands may be originally set during a manufacturing process of DSD 102 based on a typical or expected read command latency plus a standard deviation in an experimental set of read command performance latencies for the same type of flash memory, and the interval polling time may be initially set as the standard deviation of the experimental set.

During operation of DSD 102, the polling times for different logical groups can be adjusted or tuned over time based on an observed or monitored command performance latency, as described in more detail below with the example of FIG. 3. This adjustment based on monitored performance of groups of different portions of flash memory 108 depending on the number of P/E cycles and/or a physical location can ordinarily allow for a better balance of polling times over the life of the DSD in terms of not waiting too long to request a status, while not requiring too may status requests for the same command so as to waste processing and communication resources of DSD 102.

Monitoring module 12 can estimate a command performance latency from the number of status requests shown in FIG. 2. The observed or estimated latency can be represented as $T=T_0+T_{int}\times N$, where N is the number of polling requests after the initial polling request, $P_0$, that are sent before a "ready" status is returned. In the example of FIG. 2, N is 5, such that the estimated or observed command performance latency for the command in FIG. 2 equals $T_0+5 T_{int}$. Monitoring module 12 can then store the estimated or observed latency in a latency data queue 14 for the portion of flash memory 108.

Figure 3:
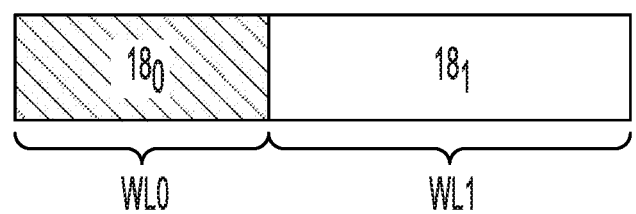
FIG. 3 illustrates an example of the grouping of portions of a flash memory into logical groups according to an embodiment.
Figure 3:
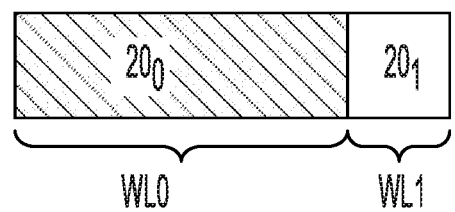

FIG. 3 illustrates an example of the grouping of portions of flash memory 108 based on a number of P/E cycles and physical level locations into logical groups. As shown in FIG. 3, logical groups $18_0$ and $18_1$ include portions of flash memory 108, such as blocks or pages, that have between and including 0 and 100 P/E cycles (i.e., less than 101 P/E cycles). Logical groups $18_0$ and $18_1$ are further grouped by their physical location as being above or below a WL level. WL0 of logical group $18_0$ indicates that the portions of flash memory 108 in logical group $18_0$ are below a particular stack height, such as being in the bottom twelve cell layers. WL1 of logical group $18_1$, on the other hand, indicates that the portions of flash memory 108 are above a particular stack height, such as being in the top twelve cell layers.

As shown in FIG. 3, the relative sizes of the logical groups within the P/E cycle group 18 do not need to be the same. In this regard, more portions of flash memory 108 (e.g., blocks or pages) are in logical group $18_1$ than in logical group $18_0$. In other implementations, P/E cycle groups may be further sub-grouped into more logical sub-groups based on more WL levels or based on other physical location demarcations, such as being sub-grouped based on a die or plane physical location that includes multiple dies.

Logical groups $20_1$ and $20_2$ in the example of FIG. 3 include portions of flash memory 108 that have between and including 101 to 1,000 P/E cycles (i.e., greater than 100 P/E cycles and less than 1,001 P/E cycles). Logical groups $20_1$ and $20_2$ are further sub-grouped by their physical location as being above or below a WL level. WL0 of logical group $20_0$ indicates that the portions of flash memory 108 in logical group $20_0$ are below a particular stack height, and WL1 of logical group $20_1$ indicates that the portions in logical group $20_1$ are above a particular stack height. As shown in FIG. 3, the relative sizes of the logical groups or sub-groups can have varying sizes depending on their use (e.g., P/E cycles) and/or physical locations. For example, the size of P/E group 18 is larger than the size of P/E group 20. As use of flash memory 108 increases, portions of flash memory may be regrouped from P/E group 18 to P/E group 20, which can have different polling times than P/E group 20 to reflect the increased use of these portions of flash memory 108.

In some implementations, firmware 10 tracks the number of P/E cycles for the portions on a block level and/or page level, and maintains an indication of the physical level location of blocks or pages so that the portions of flash memory 108 can be logically grouped by control circuitry 106. In many cases, information such as the number of P/E cycles is also used for other maintenance operations for flash memory 108, such as for wear leveling to spread out the usage of flash memory 108 and prolong a usable life of flash memory 108. However, even with wear leveling, differences in the number of P/E cycles for different portions of flash memory 108 can affect command performance latencies. The present disclosure can consider such differences in setting polling times.

Other implementations may include more logical groups. In this regard, and as discussed in more detail below, the size of the logical groups can be adjusted over time based on a monitored command performance latency for the logical group. Such an adjustment in group size ordinarily allows for better tailored polling times to further improve the performance efficiency of flash memory 108 (e.g., IOPS). In addition, the sizes, logical groupings, and/or the number of logical groupings may change as the number of P/E cycles increases throughout the life of flash memory 108. This ordinarily allows for the varying usage of different portions of flash memory 108 to be accounted for in providing a better balance in polling times between waiting too long before requesting a command status and requesting a command status too soon.

FIG. 4 is an example of monitored command performance latency for the logical groups of FIG. 3. In the example of FIG. 4, command performance latencies are collected for each logical group into respective latency data queues 14. In more detail, command performance latencies $a_0$ to $a_n$ are collected into queue $14_0$ for logical group $18_0$, command performance latencies $b_0$ to $b_n$ are collected into queue $14_1$ for logical group $18_1$, command performance latencies $c_0$ to $c_n$ are collected into queue $14_2$ for logical group $20_0$, and command performance latencies $d_0$ to $d_n$ are collected into queue $14_3$ for logical group $20_1$.

The command performance latencies can include, for example, a time or indication of the amount of time amount of time before a command completion status is returned from flash memory 108 to control circuitry 106 for a specific type of command, such as for a write command, read command, or erase command. In this regard, some implementations can include a separate latency data queue for each type of command. In addition, monitoring module 12 may only periodically monitor or collect command performance latencies for a predetermined number of commands corresponding to a size of a latency data queue 14, such as the first 1,000 write commands for each logical group in a given day, week, or month.

As discussed in more detail below, the collection of command performance latencies for each logical group can allow for statistical calculations and/or the use of a Machine Learning (ML) algorithm, such as a neural network, to be applied using the command performance latencies as an input. In some implementations, this can include performing one or more statistical calculations, such as a mean command performance latency and a standard deviation for the command performance latencies collected for each logical group. Control circuitry 106 can then use such outputs or calculations to set new polling times for the logical groups, thereby tuning the polling times to the particular portions of flash memory 108 included in the logical group.

The use of a latency data queue for each logical group can allow for enough latency data (e.g., command performance latencies) to be collected for each logical group to update at least one polling time for the logical group. However, other implementations may use an online algorithm to continually monitor and update polling times. The use of a queue having a predetermined size for each logical group can conserve processing and memory resources as compared to continually monitoring command performance latencies and continually calculating new polling times. For example, assuming a queue size of 1,000 entries and logical groups for 16 dies each having two different P/E cycle ranges and 96 WL levels, and each latency data value in the queue consuming 4 bytes, the total memory space consumed, such as in RAM 112, would be 768 KB multiplied by 16 for each die.

FIG. 5 is an example of polling times set for the logical groups of FIG. 4 for different types of operations. As shown in FIG. 5, different polling times including an initial polling time of $T_0$ and an interval polling time of $T_{int}$ are set for the different logical groups $18_0$, $18_1$, $20_0$, and $20_1$. The polling times can be stored, for example, as polling times $16_0$ for read commands, $16_1$ for programming commands (i.e., write commands), and $16_2$ for erase commands.

The polling times $16_0$ for read commands are generally shorter than the program polling times $16_1$ and the erase polling times $16_2$. This is due to a generally quicker performance of read commands in flash memory 108 than for program and erase commands. In this regard, the setting of polling times in the present disclosure may in some cases be most noticeable for read commands since more of the delay after a read command can be attributed to time wasted with an otherwise inefficient polling time. The polling time setting processes described herein can be especially useful in ensuring a specified Quality of Service (QoS) for read commands.

As noted above, the use of different polling times for different portions of flash memory 108 that have been logically grouped by use (e.g., by a number of P/E cycles) and/or by a physical location (e.g., by a physical level location in a 3D-NAND) can improve the performance efficiency of flash memory 108 so that control circuitry 106 is not issuing too many or two few status requests. As shown in the example polling times of FIG. 5, the increased use or number of P/E cycles for logical groups $20_0$ and $20_1$ generally leads to longer polling times as compared to logical groups $18_0$ and $18_1$ having a lower number of P/E cycles.

As discussed above with reference to FIG. 4, the polling times set in FIG. 5 can be adjusted over time based on updated monitoring of command performance latencies for the different logical groups. In addition, the size and number of logical groups may change over time. Other implementations of polling times 16 can include a different number of polling time types, such as only including a single polling time or including an initial polling time, a second polling time, and an interval polling time to be used after the second polling time.

Example Processes

Figure 6:
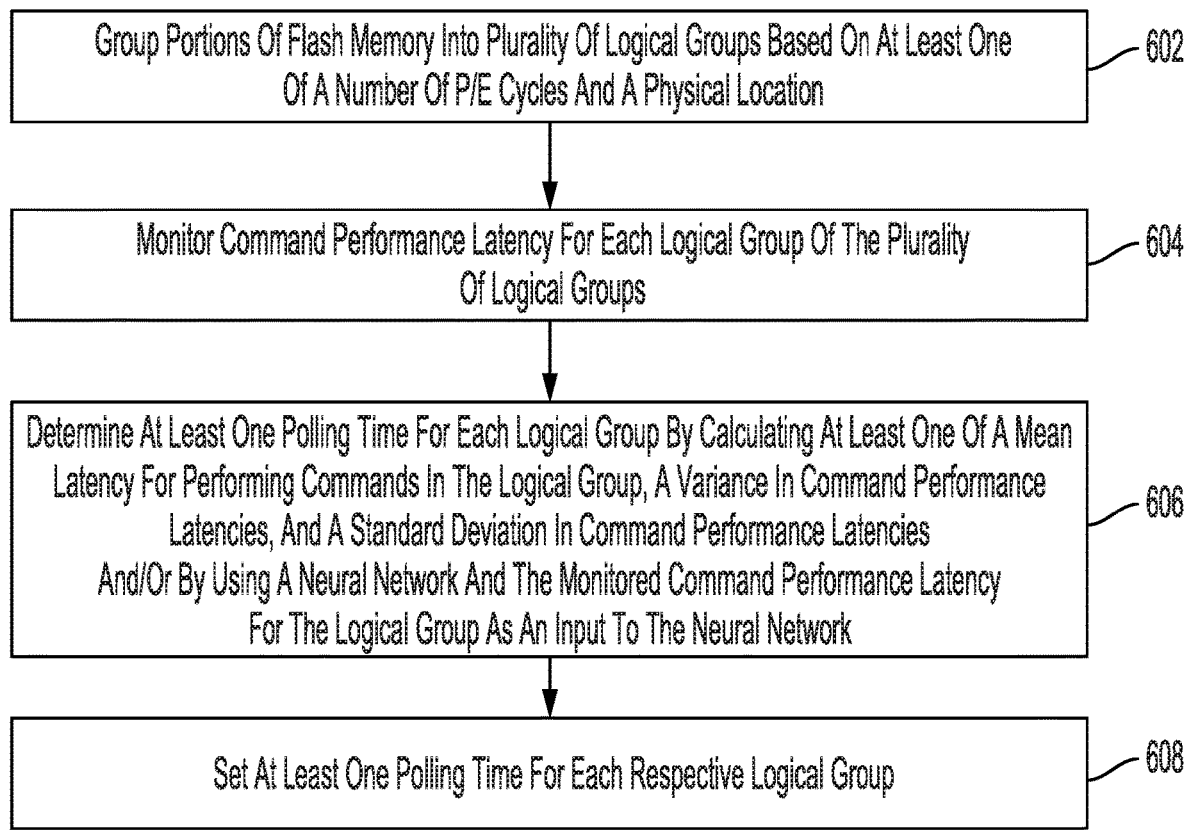
FIG. 6 is a flowchart for a polling time setting process according to an embodiment.

FIG. 6 is a flowchart for a polling time setting process according to an embodiment. The polling time setting process can be performed, for example, in the field to update previously set polling times or as part of a factory initialization process using experimental commands performed by control circuitry 106 executing firmware 10 in FIG. 1. In other implementations, the polling time setting process may be performed by a host (e.g., host 101 in FIG. 1) or other device in the field or as part of a factory initialization process executing a driver for DSD 102 or a factory initialization module.

In block 602, portions of flash memory 108 are grouped into a plurality of logical groups based on at least one of a number of P/E cycles and a physical location. In some implementations, the logical groups may be determined using one or more P/E cycle thresholds, such as 100 P/E cycles and 500 P/E cycles. Logical grouping based on a physical location can consider, for example, whether the physical location of the portion of flash memory 108 is vertically above or below a particular WL level in a 3D NAND flash memory. In other embodiments, the portions of flash memory 108 may be logically grouped based on another type of physical location, such as whether the portion of flash memory 108 is in a particular plane or die of flash memory 108.

In block 604, a command performance latency is monitored for each logical group of the plurality of logical groups. The command performance latency can include, for example, a time or indication of time from when a command is issued until a command completion status is returned to control circuitry 106. In some implementations, the monitoring of a command performance latency can be performed by monitoring module 12 for a predetermined number of commands or for a predetermined period of time. The monitored command performance latencies can also be separated into different types of commands (e.g., program/write, read, and erase commands). The command performance latencies may be stored, for example, in respective latency data queues (e.g., latency data queues 14 in FIGS. 1 and 4) for further processing by control circuitry 106.

In block 606, at least one polling time is determined for each logical group by performing one or more statistical calculations and optionally using a neural network that uses the monitored command performance latency as an input for the logical group. In some implementations, at least one of a mean latency for performing commands in the logical group, a variance of the latency values, and a standard deviation of the latency values can be used to determine at least one polling time for the logical group. The statistics calculated from the command performance latencies for the logical group can be used to improve the polling times (i.e., better balance between too long of a polling time and too short of a polling time).

In some implementations, the mean command performance latency may be set as an initial polling time (i.e., $T_0$ in FIG. 2) for the logical group, and a standard deviation for the monitored command performance latency (i.e., the command performance latencies in latency data queue 14 for the logical group) can be set as an interval polling time (i.e., $T_{int}$ in FIG. 2). In yet other implementations, a corrected mean command performance latency may be estimated as the initial polling time by subtracting the standard deviation in command performance latencies from the mean command performance latency. This can ordinarily provide a more accurate estimate of the actual mean command performance latency, since the actual completion of a command occurs at some point before the last status request is received. For example, in FIG. 2, the actual completion of the command occurs between $P_4$ and $P_5$, but the command performance latency recorded for the command includes the entire time between $P_4$ and $P_5$. Subtracting a standard deviation from the mean command performance latency ordinarily provides a more accurate initial polling time to account for the actual completion of commands before the last status request.

In addition, some implementations may update or set the interval polling time less frequently than the initial polling time. In this regard, the standard deviation, which may be used as the interval polling time, generally changes less over time than the mean command performance latency or estimated corrected mean command performance latency, which may be used as the initial polling time. By not calculating the standard deviation with each iteration of block 606, processing and memory resources can be conserved. For example, the initial polling time, $T_0$, may be determined and set with each iteration of blocks 606 and 608, while the interval polling time, $T_{int}$, may only be determined and set with every other iteration of blocks 606 and 608.

In some implementations, an online algorithm can be used to update or calculate statistical values, such as a mean command performance latency and a variance or standard deviation, as the observed command performance latencies are added to a latency data queue 14. In one example, a Welford online algorithm can be used to calculate a variance, and a standard deviation calculated from the variance that can be set as a new interval polling time (i.e., $T_{int}$ in FIG. 2) after the queue becomes full. In such an example, the Welford online algorithm can be used by firmware 10 to calculate a sample variance (i.e., $s_n^2$) or a population variance (i.e., $\sigma_n^2$) with the following equations.

$$M_{2,n} = M_{2,n-1} + (x_n - \overline{x}_{n-1})(x_n - \overline{x}_n)$$

$$s_n^2 = \frac{M_{2,n}}{n-1}$$

$$\sigma_n^2 = \frac{M_{2,n}}{n}$$

In the above equations, $M_{2,n}$ represents a sum of the squares of differences between the observed latencies, $x_i$, and a current mean latency, $\overline{x}_n$, with $x_n$ being a current observed command performance latency. $M_{2,n-1}$ represents the previous sum of squares of differences, and $\overline{x}_{n-1}$ represents the previous mean latency. In this regard, $M_{2,n}$ can be expressed as $\Sigma_{i=1}^{n}(x_i - \overline{x}_n)^2$. Control circuitry 106 can then calculate the square root of either the sample variance, $s_n^2$, or the population variance, $\sigma_n^2$, to derive a standard deviation to set as the interval polling time, $T_{int}$.

Figure 7:
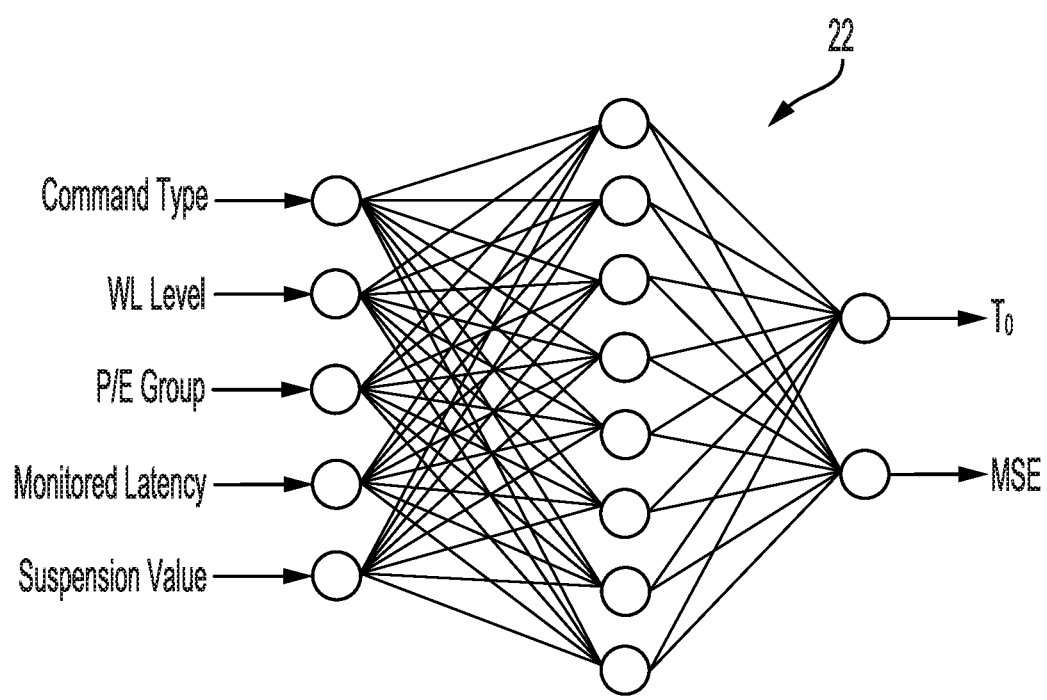
FIG. 7 illustrates an example of using a neural network to determine polling times for a logical group according to an embodiment.

In some implementations, the observed or monitored command performance latencies can be input to a neural network to derive one or more polling times, as in the example shown in FIG. 7. A neural network may include an input layer, and output layer, and any number of intermediate, internal, or "hidden" layers between the input and output layers. The individual layers may include any number of separate nodes. The nodes in each layer connect to nodes in the subsequent layer and the strengths of these interconnections are typically learned from data during a training process. Once trained, a neural network can be used for inference, that is, provided with new input data in order to predict a corresponding output. Nodes of adjacent layers may be logically connected to each other, and each logical connection between the various nodes of adjacent layers may be associated with a respective weight.

Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. Each node passes the result of this weighted sum of inputs through a non-linear function (such as a sigmoid function, tangent hyperbolic function, Rectified Linear Unit (RELU) function, and/or the like) before sending its output to the next layer nodes.

The weights of these connections are typically learned from data during a training process, for example through backpropagation in which the network parameters are tuned to produce expected outputs given corresponding inputs in labeled training data. The neural network can repeatedly process the input data, and the parameters (e.g., weight matrices) of the neural network can be modified in what amounts to a trial-and-error process until the model produces (or converges on) results substantially close to a correct or preferred output. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

The training of a neural network can require significant processing and memory resources. In some implementations, the training of a neural network for determining polling times can be done during idle periods when DSD 102 is not servicing or performing other commands or may be performed initially as part of a factory process. Flash memories with more variance in command performance latencies among its dies may require retraining of a neural network in the field, while flash memories with less variance in command performance latencies may only need a neural network to be trained once.

In addition, DSD 102 can include one or more accelerators or dedicated processors for training the neural network. In this regard, the use of one or more neural networks for deriving polling times may be better suited to larger scale data storage environments, such as for arrays of SSDs, as compared to embedded DSDs. In some implementations, inferenced results or outputs of the neural network, such as an initial polling time $T_0$ and a Mean Squared Error (MSE)

used to determine an interval polling time $T_{int}$, can be stored in a lookup table for different inputs to reduce the computational overhead in performing feedforward processing using the neural network.

In the example of FIG. 7, neural network 22 can include inputs of a command type (e.g., program/write command, read command, or erase command), a WL level for the logical group (e.g., WL0 or WL1 in FIG. 3), a P/E group (e.g., P/E group 18 or 20 in FIG. 3), a monitored latency (e.g., latency data collected in a latency data queue 14 for the logical group), and a suspension value indicating a level of write and/or erase suspension being used for the logical group (e.g., a write suspension or erase suspension value of 0 or 1). In this regard, write suspension can defer performing write commands so that faster completing read commands can be performed, and erase suspension can defer performing erase commands so that faster completing read commands can be performed.

In other implementations, different inputs may be used by neural network 22. For example, in some implementations, a dedicated neural network may be used for each logical group, rather than one neural network being used for all the logical groups. The inputs to such dedicated neural networks would not include P/E group or WL level inputs, since these inputs would be the same for each use of the dedicated neural network.

As shown in FIG. 7, the outputs of neural network 22 include an initial polling time, $T_0$, and an MSE that can be used to determine an interval polling time, $T_{int}$. In the example of FIG. 7, one hidden layer is shown between the input layer and the output layer, however, other implementations of a neural network can include more hidden layers. In addition, other implementations can include different outputs, such as an inferred command completion time or an inferred $T_{int}$.

Returning to the polling time setting process of FIG. 6, the polling time or times determined in block 606 through the use of statistical calculations and/or one or more neural networks are set in block 608 as a polling time or polling times for each respective logical group. The polling times can be set, for example, as part of polling times 16 shown in FIG. 1 or FIG. 5. As noted above, the polling time setting process of FIG. 6 may be used for initially setting polling times using experimental commands or for updating previously set polling times, such as updating default polling times after a certain time period of operation, or after a certain number of P/E cycles for flash memory 108. In this regard, the setting of a polling time can include maintaining the same polling time as a previous polling time if the newly determined polling time matches the previous polling time. As discussed in more detail below with reference to FIG. 8, the polling time setting process of FIG. 6 may also be performed after a change to the number of logical groups or to the size of a logical group, such as when one or more portions of flash memory 108 are regrouped to a different logical group.

Figure 8:
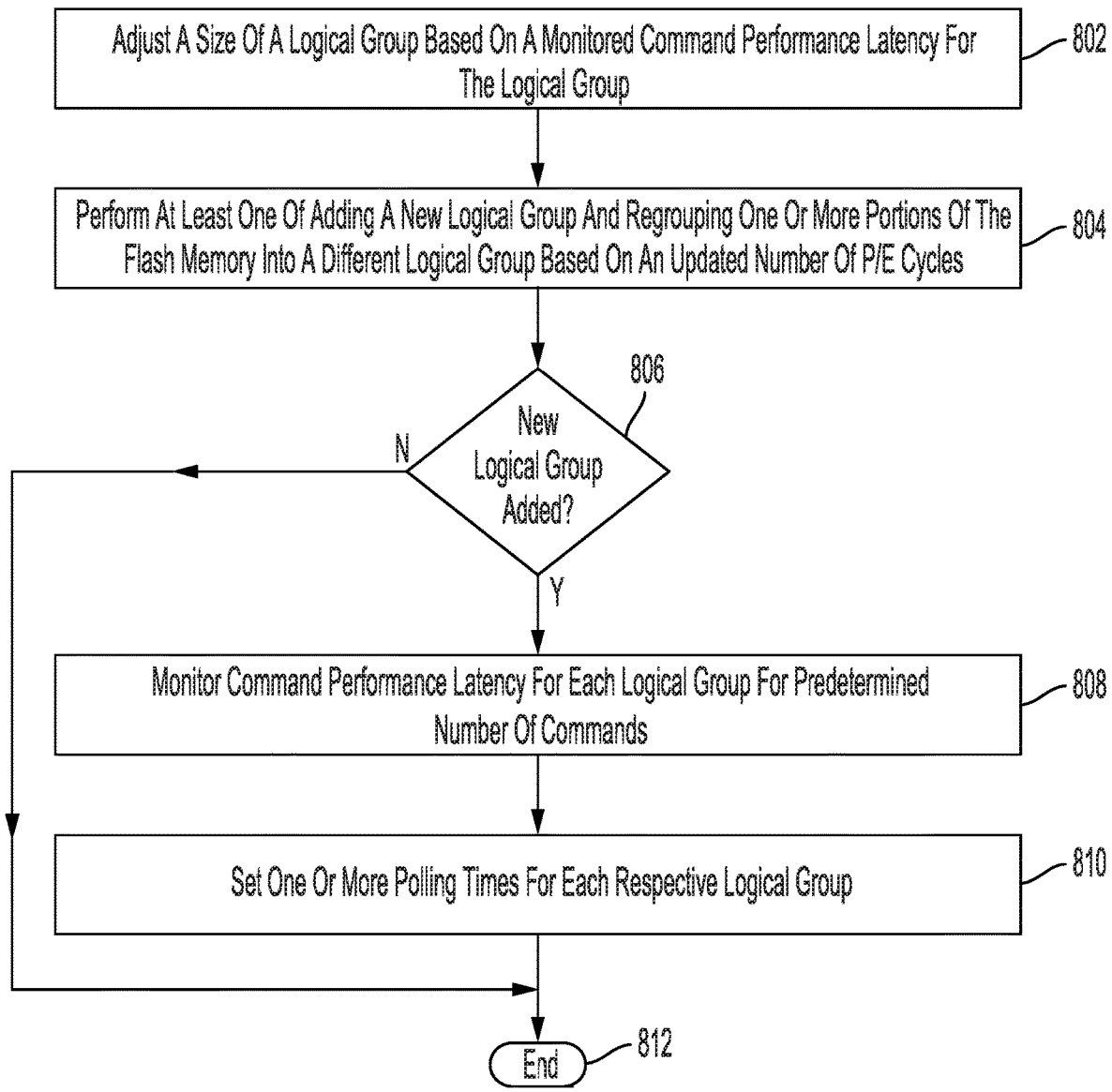
FIG. 8 is a flowchart for a logical group adjustment process according to an embodiment.

FIG. 8 is a flowchart for a logical group adjustment process according to an embodiment. The logical group adjustment process of FIG. 8 can be performed, for example, by control circuitry 106 executing firmware 10.

In block 802, a size of a logical group is adjusted based on a monitored command performance latency for the logical group. In some implementations, the size of a logical group can be decreased when the difference between a newly determined initial polling time and a previous initial polling time is greater than an upper threshold value, and the size of the logical group can be increased when the difference between the new initial polling time and the old initial polling time is less than a lower threshold value. In other implementations, a single threshold value may be used to increase and decrease the logical group size, rather than lower and upper threshold values where no change is made to the group size between the lower and upper threshold values. In addition, other implementations may instead consider the change of a different polling time, such as an interval polling time, when adjusting a group size.

The increase or decrease in group size can be by a predetermined step size, such as a number of pages or blocks of flash memory 108 that fall within the range of P/E cycles and/or physical location (e.g., WL level) for the logical group. The size of the logical groups may also be limited by a maximum or minimum size. The dynamic adjustment of group size based on a monitored command performance can ordinarily improve the efficiency of the polling times, since too great a change in polling times can indicate too much variance within the logical group for command performance latency.

In block 804, at least one of a new logical group is added and one or more portions of flash memory 108 are regrouped into a different logical group based on an updated number of P/E cycles. As the number of P/E cycles increases over time, certain portions of flash memory 108 will exceed the upper limit of the number of P/E cycles for their group and are moved into a new logical group. In cases where there is not a next logical group with a higher limit for P/E cycles, a new logical group is added. In such cases, the ranges or limits for the number of P/E cycles for all the logical groups can be adjusted upwards.

In block 806, it is determined whether a new logical group was added. If not, the logical group adjustment process of FIG. 8 ends at block 812. On the other hand, if a new logical group was added based on the updated number of P/E cycles in block 804, the command performance latency for each logical group is monitored in block 808 for a predetermined number of commands, such as to fill a latency data queue 14 for the logical group. As noted above, the use of a latency data queue for each logical group can allow for enough latency data (e.g., command performance latencies) to be collected for the logical group to update at least one polling time for the logical group. This can ordinarily allow for the conservation of processing and memory resources as compared to continually monitoring command performance latencies and continually calculating new polling times. However, other implementations may use an online algorithm, such as a Welford online algorithm, to continually monitor and update polling times.

In block 808, command performance latencies are monitored for each logical group, including any newly added logical groups, for a predetermined number of commands. For example, monitoring module 12 may monitor 1,000 read commands, 1,000 write commands, and 1,000 erase commands for each logical group to fill respective data latency queues 14. In other implementations, logical groups that have not changed may not be monitored so as to not have their polling times reevaluated. However, the addition of a new logical group typically changes the portions of flash memory 108 belonging to each logical group, so as to warrant a reevaluation of the polling times for all logical groups.

In block 810, one or more polling times determined from the monitored command performance latencies are set for each respective logical group. In this regard, the setting of a polling time can include maintaining the same polling time as a previous polling time if the newly determined polling time matches the previous polling time. In some implementations, an initial polling time (e.g., $T_0$ in FIG. 2) and an interval polling time (e.g., $T_{int}$) can be set based on the command performance latencies monitored in block 808. Statistical calculations, such as a mean command performance latency, a variance in command performance latencies, and a standard deviation in command performance latencies may be used for determining the polling time or polling times set in block 810. Some implementations may use one or more neural networks in addition to or in place of such statistical calculations, as discussed above with reference to FIG. 7.

In some cases, only a subset of polling times for the logical group may be set in block 810. For example, initial polling times may be set with each iteration of block 810, while a different polling time, such as interval polling times may only be set every fourth iteration of block 810. The logical group adjustment process of FIG. 8 ends with block 812.

As discussed above, grouping portions of a flash memory into logical groups based on at least one of a number of P/E cycles and a physical location can allow for improving polling times for determining when portions of the flash memory are available after performing a command. In addition, adjusting the logical groups accounts for changes in the flash memory over time, such as due to wear on the memory cells, in setting polling times that provide a better balance between issuing too many status requests and improving the performance of the flash memory by not waiting too long after completing a command before issuing the next command.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
  a flash memory for storing data; and
  a controller configured to:
    group portions of the flash memory into a plurality of logical groups based at least in part on a number of Program/Erase (P/E) cycles;
    monitor command performance latency for each logical group of the plurality of logical groups, wherein the command performance latency indicates time from command issuance to command completion; and
    based on the monitored command performance latency for each logical group, set at least one polling time for each respective logical group of the plurality of logical groups, wherein the at least one polling time indicates a time to wait before checking whether a portion of the flash memory in the logical group has completed a command.

2. The DSD of claim 1, wherein the controller is further configured to determine the at least one polling time by calculating at least one of a mean latency for performing commands in the logical group, a variance in latencies for performing commands in the logical group, and a standard deviation in latencies for performing commands in the logical group.

3. The DSD of claim 1, wherein the controller is further configured to determine the at least one polling time using a neural network and the monitored command performance latency for the logical group as an input to the neural network.

4. The DSD of claim 1, wherein the flash memory is a 3D flash memory, and wherein the controller is further configured to group the portions of the flash memory into the plurality of logical groups based on a physical level location of the portions in the 3D flash memory.

5. The DSD of claim 1, wherein the controller is further configured to adjust a size of a logical group of the plurality of logical groups based on the monitored command performance latency for the logical group.

6. The DSD of claim 1, wherein the controller is further configured to, based on updated numbers of PIE cycles for the portions of the flash memory, perform at least one of adding a new logical group to the plurality of logical groups and regrouping one or more portions of the flash memory into a different logical group of the plurality of logical groups.

7. The DSD of claim 6, wherein in response to the addition of a new logical group to the plurality of logical groups, the controller is further configured to:
monitor command performance latency for each logical group of the plurality of logical groups for a predetermined number of commands in each respective logical group; and
based on the monitored command performance latency for each logical group for the predetermined number of commands, set one or more polling times for each respective logical group.

8. The DSD of claim 1, wherein in monitoring command performance latency for each logical group of the plurality of logical groups, the controller is further configured to:
collect command performance latencies for each logical group into respective queues; and
perform one or more statistical calculations on the command performance latencies in each of the respective queues.

9. The DSD of claim 1, wherein the at least one polling time for each logical group includes an initial polling time indicating a time to wait before initially checking whether a portion of the flash memory in the logical group has completed the command, and an interval polling time indicating a time to wait after initially checking whether the portion of the flash memory in the logical group has completed the command and determining that the portion of the flash memory has not completed the command, and
wherein the controller is further configured to set the interval polling time less frequently than setting the initial polling time.

10. The DSD of claim 1, wherein the at least one polling time for each logical group includes an initial polling time indicating a time to wait before initially checking whether a portion of the flash memory in the logical group has completed the command, and
wherein the controller is further configured to:
calculate a mean command performance latency for the logical group;
calculate a standard deviation in the command performance latency for the logical group;
estimate a corrected mean command performance latency for the logical group by subtracting the calculated standard deviation from the mean command performance latency; and
set the estimated corrected mean command performance latency as the initial polling time.

11. A method for operating a Data Storage Device (DSD) including a flash memory for storing data, the method comprising:
grouping portions of the flash memory into a plurality of logical groups based on at least one of a number of Program/Erase (P/E) cycles and a physical level location of the portions in the flash memory;
monitoring command performance latency for each logical group of the plurality of logical groups, wherein the command performance latency indicates time from command issuance to command completion; and
based on the monitored command performance latency for each logical group, setting at least one polling time for each respective logical group of the plurality of logical groups, wherein the at least one polling time indicates a time to wait before checking whether a portion of the flash memory in the logical group has completed a command; and
wherein the method is performed by a controller of the DSD.

12. The method of claim 11, further comprising determining the at least one polling time by calculating at least one of a mean latency for performing commands in the logical group, a variance in latencies for performing commands in the logical group, and a standard deviation in latencies for performing commands in the logical group.

13. The method of claim 11, further comprising determining the at least one polling time using a neural network and the monitored command performance latency for the logical group as an input to the neural network.

14. The method of claim 11, further comprising adjusting a size of a logical group of the plurality of logical groups based on the monitored command performance latency for the logical group.

15. The method of claim 11, further comprising, based on updated numbers of PIE cycles for the portions of the flash memory, performing at least one of adding a new logical group to the plurality of logical groups and regrouping one or more portions of the flash memory into a different logical group of the plurality of logical groups.

16. The method of claim 15, wherein in response to the addition of a new logical group to the plurality of logical groups, the method further comprises:
monitoring command performance latency for each logical group of the plurality of logical groups for a predetermined number of commands in each respective logical group; and
based on the monitored command performance latency for each logical group for the predetermined number of commands, setting one or more polling times for each respective logical group.

17. The method of claim 11, wherein in monitoring command performance latency for each logical group of the plurality of logical groups, the method further comprises:
collecting command performance latencies for the logical groups into respective queues; and
performing one or more statistical calculations on the command performance latencies in each of the respective queues.

18. The method of claim 11, wherein the at least one polling time for each logical group includes an initial polling time indicating a time to wait before initially checking whether a portion of the flash memory in the logical group has completed the command, and an interval polling time indicating a time to wait after initially checking whether the portion of the flash memory in the logical group has completed the command and determining that the portion of the flash memory has not completed the command, and
wherein the method further comprises setting the interval polling time less frequently than the initial polling time.

19. The method of claim 11, wherein the at least one polling time for each logical group includes an initial polling time indicating a time to wait before initially checking whether a portion of the flash memory in the logical group has completed the command, and
wherein the method further comprises:
calculating a mean command performance latency for the logical group;
calculating a standard deviation in the command performance latency for the logical group;

estimating a corrected mean command performance latency for the logical group by subtracting the calculated standard deviation from the mean command performance latency; and setting the estimated corrected mean command performance latency as the initial polling time.

20. A non-transitory computer readable medium storing computer-executable instructions, wherein when the computer-executable instructions are executed by a controller of a Data Storage Device (DSD) including a flash memory, the computer-executable instructions cause the controller to:

group portions of the flash memory into a plurality of logical groups based at least in part on a number of Program/Erase (P/E) cycles;

monitor command performance latency for each logical group of the plurality of logical groups, wherein the command performance latency indicates time from command issuance to command completion; and based on the monitored command performance latency for each logical group, set at least one polling time for each respective logical group of the plurality of logical groups, wherein the at least one polling time indicates a time to wait before checking whether a portion of the flash memory in the logical group has completed a command.

21. A Data Storage Device (DSD), comprising:
a flash memory for storing data; and
a controller configured to:

group portions of the flash memory into a plurality of logical groups based at least in part on a number of Program/Erase (P/E) cycles;

monitor command performance latency for each logical group of the plurality of logical groups;

based on the monitored command performance latency for each logical group, set at least one polling time for each respective logical group of the plurality of logical groups, wherein the at least one polling time indicates a time to wait before checking whether a portion of the flash memory in the logical group has completed a command;

based on updated numbers of P/E cycles for the portions of the flash memory, perform at least one of adding a new logical group to the plurality of logical groups and regrouping one or more portions of the flash memory into a different logical group of the plurality of logical groups;

in response to the addition of a new logical group to the plurality of logical groups, monitor command performance latency for each logical group of the plurality of logical groups for a predetermined number of commands in each respective logical group; and based on the monitored command performance latency for each logical group for the predetermined number of commands, set one or more polling times for each respective logical group.

22. A Data Storage Device (DSD), comprising:
a flash memory for storing data; and
a controller configured to:

group portions of the flash memory into a plurality of logical groups based at least in part on a number of Program/Erase (P/E) cycles;

monitor command performance latency for each logical group of the plurality of logical groups;

based on the monitored command performance latency for each logical group, set at least one polling time for each respective logical group of the plurality of logical groups, wherein the at least one polling time indicates a time to wait before checking whether a portion of the flash memory in the logical group has completed a command; and set an interval polling time less frequently than setting an initial polling time, wherein the initial polling time indicates a time to wait before initially checking whether a portion of the flash memory in the logical group has completed the command, and the interval polling time indicates a time to wait after initially checking whether the portion of the flash memory in the logical group has completed the command and determining that the portion of the flash memory has not completed the command.

23. A Data Storage Device (DSD), comprising:
a flash memory for storing data; and
a controller configured to:

group portions of the flash memory into a plurality of logical groups based at least in part on a number of Program/Erase (P/E) cycles;

monitor command performance latency for each logical group of the plurality of logical groups;

based on the monitored command performance latency for each logical group, set at least one polling time for each respective logical group of the plurality of logical groups, wherein the at least one polling time indicates a time to wait before checking whether a portion of the flash memory in the logical group has completed a command;

calculate a mean command performance latency for the logical group;

calculate a standard deviation in the command performance latency for the logical group;

estimate a corrected mean command performance latency for the logical group by subtracting the calculated standard deviation from the mean command performance latency; and set the estimated corrected mean command performance latency as an initial polling time indicating a time to wait before initially checking whether a portion of the flash memory in the logical group has completed the command.

* * * * *